(12) United States Patent
Gagliardoni

(10) Patent No.: US 12,683,818 B2
(45) Date of Patent: Jul. 14, 2026

(54) PROVIDING SECURE INTERNET ACCESS TO A CLIENT DEVICE IN A REMOTE LOCATION

(71) Applicant: NAGRAVISION SARL, Cheseaux-sur-Lausanne (CH)

(72) Inventor: Tommaso Gagliardoni, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 91 days.

(21) Appl. No.: 18/712,207

(22) PCT Filed: Nov. 23, 2022

(86) PCT No.: PCT/EP2022/083004
§ 371 (c)(1),
(2) Date: May 21, 2024

(87) PCT Pub. No.: WO2023/094461
PCT Pub. Date: Jun. 1, 2023

(65) Prior Publication Data
US 2024/0414015 A1 Dec. 12, 2024

(30) Foreign Application Priority Data
Nov. 23, 2021 (EP) ..................................... 21250008

(51) Int. Cl.
*H04L 9/00* (2022.01)
*G06Q 20/36* (2012.01)
(Continued)

(52) U.S. Cl.
CPC ............... *H04L 9/50* (2022.05); *G06Q 20/36* (2013.01); *H04B 7/18513* (2013.01);
(Continued)

(58) Field of Classification Search
None
See application file for complete search history.

(56) References Cited

U.S. PATENT DOCUMENTS 10,476,585 B1 * 11/2019 Torres ................ H04B 7/18521
2006/0248600 A1 11/2006 O'Neill
(Continued)

OTHER PUBLICATIONS

Wang, B., Chang, Z., Li, S. and Hämäläinen, T., 2022. An efficient and privacy-preserving blockchain-based authentication scheme for low earth orbit satellite-assisted internet of things. IEEE Transactions on Aerospace and Electronic Systems, 58(6), pp. 5153-5164. (Year: 2022).*

(Continued)

*Primary Examiner* — Luu T Pham
*Assistant Examiner* — Edward X Long
(74) *Attorney, Agent, or Firm* — POLSINELLI LLP

(57) ABSTRACT

A system for providing a client device in a remote location secure access to the internet via a satellite connection is provided includes: a client device: a satellite system configured to provide the client device with access to the internet; and an internet service provider (ISP), wherein, during a registration process: the satellite system is configured to receive a first blockchain state signal which encodes information about a first state of a blockchain, and to generate and transmit a first RF broadcast signal encoding the information about the first state of the blockchain: the client device is configured to receive the first RF broadcast signal, to generate a registration request based on the information about the state of the blockchain, the registration request including a public key ID associated with the client device, and to be transmitted to an electronic address corresponding to a blockchain associated with the ISP, and to transmit the registration request to the satellite system: the satellite system is configured to receive the registration (Continued)

request, and to transmit it to the electronic address associated with the ISP; the ISP is configured to determine whether the registration request is a valid request, and if the registration request is a valid request, to add the public key ID to an authorized list, wherein when a public key ID is on the authorized list, the client device or user thereof is permitted to access the internet via the satellite system. Similar methods and systems relation to connection requests are also provided.

16 Claims, 15 Drawing Sheets

(51) Int. Cl.

| | | |
|---|---|---|
| *H04B 7/185* | (2006.01) | |
| *H04L 9/08* | (2006.01) | |
| *H04L 9/30* | (2006.01) | |

(52) U.S. Cl.

CPC .............. *H04L 9/0825* (2013.01); *H04L 9/30* (2013.01); *H04L 2209/80* (2013.01)

(56) References Cited

U.S. PATENT DOCUMENTS

| | | | |
|---|---|---|---|
| 2011/0093710 A1* | 4/2011 | Galvin .................. | H04L 9/0844 |
| | | | 713/169 |
| 2019/0280871 A1 | 9/2019 | Subramanian | |
| 2019/0342085 A1 | 11/2019 | Kube et al. | |
| 2019/0373137 A1* | 12/2019 | Krukar ................... | H04N 1/444 |
| 2020/0336907 A1* | 10/2020 | Jain ........................ | H04L 9/3236 |
| 2022/0286845 A1* | 9/2022 | Vanoss ................... | H04W 4/80 |

OTHER PUBLICATIONS

Xu, R., Chen, Y., Blasch, E. and Chen, G., 2019. Exploration of blockchain-enabled decentralized capability-based access control strategy for space situation awareness. Optical Engineering, 58(4), pp. 041609-041609. (Year: 2019).*

European Search Report dated May 16, 2022, for European Patent Application No. 21250008.6; 12 pages.

International Search Report and Written Opinion for PCT Application No. PCT/EP2022/083004 dated Feb. 13, 2023; 13 pages.

* cited by examiner

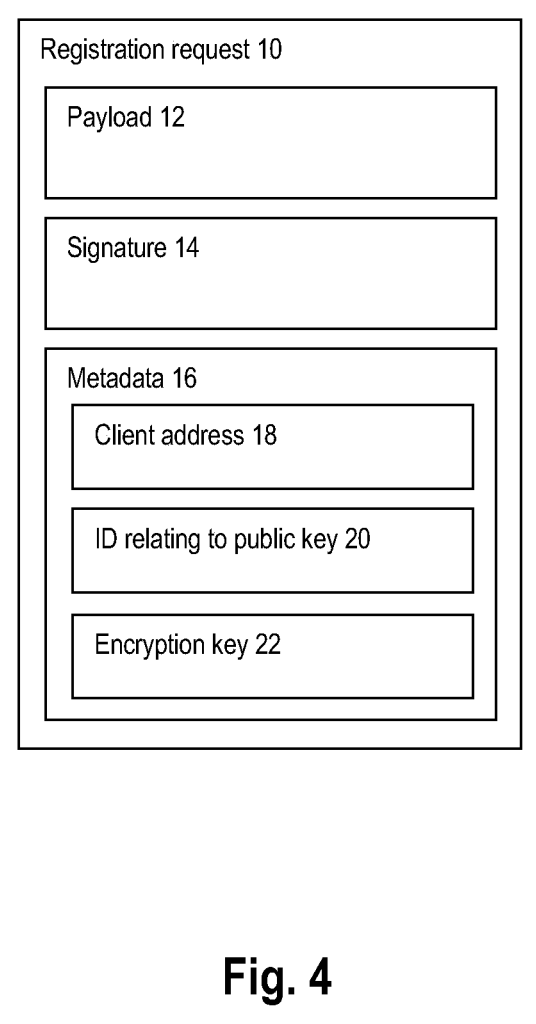

Registration request 10

Payload 12

Signature 14

Metadata 16

Client address 18

ID relating to public key 20

Encryption key 22

Fig. 4

PROVIDING SECURE INTERNET ACCESS TO A CLIENT DEVICE IN A REMOTE LOCATION

CROSS-REFERENCES TO RELATED APPLICATIONS

This application is a U.S. National Stage of PCT Application No. PCT/EP2022/083004, filed Nov. 23, 2022, which claims the priority benefit of European Patent Application No. 21250008.6 filed on Nov. 23, 2021, both of which are incorporated herein by reference in their entirety for all purposes.

TECHNICAL FIELD OF THE INVENTION

The present invention relates to methods and systems for providing a client device in a remote location with secure internet access via a satellite connection. Additional aspects of the invention relate to a satellite system, a client device, and methods performed by those components.

BACKGROUND TO THE INVENTION

When a user wishes to access the internet, the internet service provider invariably requires that the user registers a new account. Generally, this requires the user to provide a personal (valid) email address, a suitable username, and a password. Often, the user must also receive an authentication code via email. The user must then remember the username and password for subsequent access. Often, the user also needs to provide a valid mobile phone number, credit card details, and even a copy of their ID or proof of address. This is cumbersome for the user and the internet service provider, and requires that the user expose their personal data. This is undesirable for privacy regulations, and also represents a liability for the service provider.

In addition to this, it is often desirable for users to access the internet from remote locations (defined later in the application in more detail), in which no internet connectivity is available. This is often challenging.

The present invention aims to provide ways in which a user can connect securely to the internet from a remote location, without the need to submit various pieces of personal data.

SUMMARY OF THE INVENTION

Aspects of the present invention relate to various systems via which a client device may connect to the internet in a secure manner, and in a remote location, without having to submit any of their personal details to an internet service provider. Broadly speaking, this is achieved by providing internet access via a satellite connection, wherein registration is granted to those users who have submitted a valid registration request, and subsequently granting internet access only to those client device whose public key IDs are present on an authorized list. In order to facilitate the exchange of requests by the client device from a remote location, the client device may be configured to transmit and receive RF signals. A first aspect of the invention relates to a system configured to perform a registration process, and a second aspect of the invention relates to the same system configured to perform a connection process. A third aspect of the invention provides a system configured to perform both processes. Fourth, fifth, and sixth aspects of the invention provide methods performed by the first, second, and third aspects of the invention respectively. Further aspects relate to specific components of the system and the methods performed by those components. It must be stressed at the outset that the invention includes the combination of the aspects and preferred features described except where such a combination is clearly impermissible or expressly avoided.

In a first aspect of the invention a system for providing a client device in a remote location secure access to the internet via a satellite connection is provided, the system including: a client device; a satellite system configured to provide the client device with access to the internet; and an internet service provider (ISP), wherein, during a registration process: the satellite system is configured to receive a first blockchain state signal which encodes information about a first state of a blockchain, and to generate and transmit a first RF broadcast signal encoding the information about the first state of the blockchain; the client device is configured to receive the first RF broadcast signal, to generate a registration request based on the information about the state of the blockchain, the registration request including a public key ID associated with the client device, and to be transmitted to an electronic address corresponding to a blockchain associated with the ISP, and to transmit the registration request to the satellite system; the satellite system is configured to receive the registration request, and to transmit it to the electronic address associated with the ISP; the ISP is configured to determine whether the registration request is a valid request, and if the registration request is a valid request, to add the public key ID to an authorized list, wherein when a public key ID is on the authorized list, the client device or user thereof is permitted to access the internet via the satellite system.

We now set out various optional features, as well as clarifying the meaning of various terms set out above.

In the context of the present application, a client device may be interpreted as a device operated by a user who wishes to access the internet. The client device may be in the form of a standard computer such as a laptop, a tablet, a desktop computer, a smartphone, or the like. It is envisaged that the client device is a portable computing device, in order to enable it to be transported, by the user, to the remote location. The client device preferably includes an antenna configured to transmit and receive signals, such as RF signals. The antenna may be integral with the client device, or it may be connected or connectable to the client device. Throughout this application, where the term "client device" is used, it should be understood to refer to the client device itself, or a user thereof. For example, when referring to "a public key ID of associated with the client device", this may refer to a public key ID which is associated with the client device itself, or a public key ID associated with the user of the client device at the time, unless of course content dictates otherwise.

A central advantage of the invention is its ability to facilitate connection the internet when the client device is in a "remote location". Herein, a "remote" location should be regarded as a location in which the client device is unable to connect to the internet by other means, e.g. by a local wireless or wired network. For example, the term could refer to a location in which there is no internet access by conventional means, or a remote location which is located far from e.g. any urban developments. In this way, the present invention may be advantageous for providing internet access to users in less developed or developing countries which do not yet have a well-established internet infrastructure.

A satellite system may include a satellite and a ground station. A ground station should be understood to refer to any terrestrial assembly or entity which communicates with the satellite. In some cases, the satellite system may be a Low-Earth Orbit (LEO) satellite system (existing examples include Iridium or StarLink). These systems work with a large fleet of small low-powered satellites that move relatively fast on the sky with respect to an observer. Radio devices that connect to these systems have to hook on the radio signal of many satellites at once, and keep hooking to new satellites as these appear above the horizon, while losing connection to those satellites that disappear below the horizon. Alternatively, the satellite system may be a Mid-Earth or Geosynchronous Orbit. These are larger satellites which are either very far away from the surface of Earth and stay at a fixed position in the sky, or are closer but move relatively slowly. Each of these satellites covers a large geographical area. In these cases, the client device may require a directional antenna, such as a dish antenna, to connect. Relative to LEO satellite systems, the latency is higher because of the distance, but the bandwidth is also higher, so these systems are commonly used to provide broadband communication or HD streaming to remote areas that lack cable connection. Mid-Earth or Geosynchronous Orbit satellite systems are preferable for use with the present invention because they provide improved privacy and security. For completeness, a more detailed explanation of the interactions between the satellite system and internet service provider is set out later in this application, but broadly speaking, an internet connection via a satellite differs from a "conventional" internet connection only in that rather than e.g. requests from a client device being transmitted via cables, they are transmitted to a satellite, when then transmits the request to the ISP (or a network centre associated therewith). The ISP then transmits the response to the client device via the satellite. In an abundance of caution, we note here that the term "internet service provider" is used to refer to an organization that provides services for accessing, using, or participating in the Internet. ISPs can be organized in various forms such as commercial, community-owned, non-profit, or otherwise privately owned. Internet services typically provided by ISPs can include internet access, internet transit, domain name registration, web hosting, Usenet service, and colocation. When the present invention refers to provision of "internet access", it should be understood to cover, broadly, all of the functions which may be provided by an ISP. It should be noted that throughout the present application, any processing which takes place on the satellite system is preferably performed at the ground station, rather than at the satellite itself. Furthermore, any processing which is performed at the ground station may also be performed at the internet service provider, i.e. the satellite system (again, preferably the ground station thereof) preferably transmits the data to be processed to the internet service provider, where the data 20 processing operation takes place, and the processed data, or the result of the processing is transmitted back to the satellite system. Herein, the term "data processing" is treated broadly, to encompass any processing of any kind of data which takes place at the satellite system.

During the registration process which forms part of the first aspect of the invention, a satellite system is configured to receive a first blockchain state signal which encodes information about the first state of a blockchain. This may be an RF blockchain state signal, and accordingly the satellite system may receive this from an RF broadcasting station associated with the blockchain, or a node thereof. Throughout this application, "RF" or "radiofrequency" are used to refer to electromagnetic signals having a frequency of 30 Hz to 300 GHz. Alternatively, the first (and other) blockchain state signal(s) may be received by other means than RF. For example, the blockchain state signal may be received via the internet at a ground station of the satellite system, from the internet service provider.

At this point, the client device is in a remote location with no internet access, and is therefore unable to maintain synchronization with a blockchain. As we will see shortly, this means that the client device is unable to generate a valid registration request (or, more specifically, a correctly authenticated registration request). In order to address this, the satellite system, or alternatively, a separate component such as an RF broadcast station, is then configured to transmit a first RF broadcast signal, which contains the information about the first state of the blockchain, which may then be received by the client device. Effectively, this step enables the client device to maintain synchronization with the blockchain, even though (at this point) it does not have access to the internet. A blockchain by its very nature is constantly changing, and shortly, we set out various optional features which relate to the process via which the client device is able to remain synchronized with the blockchain, even if there is a loss of RF connectivity. In particular, if the client device loses RF connectivity such that more than one update on the state of the blockchain is missed, then it is not possible simply to resynchronize based on the most recent state of the blockchain. A full knowledge of every state of the blockchain is required.

We now set out various features relating to the maintenance of synchronization with the blockchain. In some cases, during a user's travel to the remote location (which may feasibly take some time in view of the remoteness of the location), they may miss more than one update regarding a current state of the blockchain. Accordingly, during that time, the satellite system may receive a second blockchain state signal encoding information about a second state of the blockchain, and accordingly may be configured to generate and transmit a second RF broadcast signal encoding the information about the second state of the blockchain. More generally, the satellite system may be configured to receive an $i^{th}$ blockchain state signal encoding information about an $i^{th}$ state of a blockchain, and may be configured to generate a corresponding $i^{th}$ RF broadcast signal encoding the information about the $i^{th}$ state of the blockchain; and at a time $t_i$, transmitting the $i^{th}$ broadcast signal, to be received by the client device. Here, i may take values from 1 (i.e. the first broadcast) to N (i.e. the final broadcast). N may be arbitrarily high for a constant broadcast.

The client device(s) which are to receive the RF broadcast signals, are in a remote location, which by definition may have only intermittent internet connectivity, and therefore may be unable to receive the broadcast signal at a particular time, e.g. because they are passing through an area which is unreachable by the RF broadcast signal, or due a technical error. Some implementations of methods/systems of the present invention aim to address this problem by transmitting the information several times in succession so that the client device is able to receive a set of transmissions at a later time in order to maintain synchronization with the blockchain.

Specifically, the satellite system may be configured to re-transmit the first RF broadcast signal at a third time, the third time being separated from the first time by a second interval. In this way, if, for whatever reason, the client device is unable to receive the first transmission of the first RF broadcast signal, it may be able to receive the first re-transmission of that signal. Every RF broadcast signal may be re-transmitted at least once, the first re-transmission taking place after the second interval. Specifically, the satellite system may be further configured to re-transmit the second RF broadcast signal at a fourth time, the fourth time and the second time being separated by the second interval.

Of course, it is possible that the client device may also miss the first re-transmission of the first RF broadcast signal, in which case the first RF broadcast signal may be re-transmitted a second time. This re-transmission may also be missed, and so on. In order to avoid this, the first RF broadcast signal may be re-transmitted a plurality of times after its initial broadcast. Specifically, the satellite system may be configured to: transmit the first RF broadcast signal at a time $t_{1,0}$, and re-transmit the first RF broadcast signal a plurality N times, where the $j^{th}$ re-transmission takes place at $t_{1,j}$. Each re-transmission may be separated from the previous transmission (or re-transmission) by a time:

$$\Delta t_{1,j} = (t_{1,j} - t_{1,j-1})$$

Here, the "1" in the subscript indicates that we are referring to the first RF broadcast signal. In preferred cases, the intervals $\Delta t_{1,j}$ between each successive pair of re-transmissions increases as the value of j increases. Simply put, there is longer between each pair of re-transmissions. In a particularly preferred case, as the value of j increases, the intervals $\Delta t_{1,j}$ increase exponentially.

Combining the features outlined above, it will be appreciated that each RF broadcast signal which is generated may be re-transmitted j times. The time at which the $i^{th}$ broadcast signal is re-transmitted for the $j^{th}$ time may be parameterized as $t_{i,j}$. A "history" $H_j$ may be defined as the set of RF broadcast signals having the same value of j. So, the zeroth history would represent the most recent, i.e. real-time status update, whereas the other streams $H_1$ are snapshots of the main history $H_0$ which are taken at different time points in the past. There may be N separate histories. The maximum number N of possible concurrent streams depends on the capacity of the RF broadcast channel and the bandwidth required by the blockchain on a conservative basis. For example, if the blockchain requires a bandwidth of 400 kb/s in periods of high traffic, and the radio channel broadcasts at 2 Mb/s, then there can be a maximum of N=5 parallel streams (i.e. one "original" history, and 4 retransmissions of that history). Typically, $H_1$ will only be delayed a few seconds behind the main history stream, so that short connectivity losses can be recovered. $H_2$ may be delayed slightly longer, e.g. around 30 seconds. $H_3$ may be delayed a few minutes, $H_4$ may be delayed for an hour, and so on. As discussed, the distribution of delays preferably follows an exponential curve, as this allows devices eventually to re-join the main history $H_0$ after a period of loss of connectivity. Preferably, the maximum delay $\Delta t_{max} = t_{i,N} - t_{i,0}$ is equal to the maximum tolerable offline period for a client device, which may be referred to herein as the "apnoea time". If a device loses connectivity for a period of time longer than the apnoea time, then synchronization with the blockchain is unrecoverable, and the client device may need to be reinitialized.

In some cases, the client device may lose RF connectivity, and miss an RF broadcast signal which includes information about the blockchain. As discussed, in order forestall such a problem, the satellite system may be configured to re-transmit an RF broadcast signal indicating a given state of the blockchain a plurality of times.

In this case, assuming that the duration of time for which the client device was unable to receive an RF broadcast signal is less than the apnoea time as previously defined, synchronization may be maintained by receiving a signal from a different history. Specifically, after missing a transmission of the first RF broadcast signal, the client device may be further configured to: receive a retransmitted version of the first RF broadcast signal from a subsequent history, the retransmitted version of the first RF broadcast signal encoding the information about the first state of the blockchain; and store the information about the first state of the blockchain in the memory of the device. Clearly, this can be extended to other missed broadcasts. More generally, after missing a transmission of the $i^{th}$ RF broadcast signal at a time $t_{i,0}$, the client device may be configured to receive a retransmitted version of the RF broadcast signal from a subsequent history $H_m$ at a time $t_{i,m}$ where m>0, the retransmitted version of the RF broadcast signal encoding information about the $i^{th}$ state of the blockchain; and store the information about the $i^{th}$ state of the blockchain in the memory of the device. In some cases, the history from which the subsequent transmission is the immediately next history. Or, if the period of loss of connectivity is long, the history to which the client device "re-synchronizes" may be the first history which is broadcasting the next signal which was not received by the client device.

Of course, this may be further generalized to cases where the client device misses a transmission of an RF broadcast signal in a history other than the initial history $H_0$. In such cases, the client device may be configured to "hop" from the history which it is on, to a subsequent history. It should be stressed that the client device may not necessarily hop to the immediately subsequent history (i.e. from $H_j$ to $H_{j+1}$); if several broadcasts are missed, then the client device may be configured to store the information from the first RF broadcast signal that it receives corresponding to the next block in the chain. In other words, after the device 102 misses one or more transmissions of an $i^{th}$ RF broadcast signal in a history $H_j$ at a time or series of times $t_{i,j}$, the client device may be configured to receive a retransmitted version of the RF broadcast signal from a subsequent history $H_k$ at a time $t_{i,k}$ where k>j, the retransmitted version of the RF broadcast signal encoding information about the $i^{th}$ state of the blockchain; and store the information about the $i^{th}$ state of the blockchain in the memory of the device. It should be stressed that the time $t_{i,k}$ is later than the time at which the device regains connectivity. Each history may be transmitted on a different channel, such as a frequency channel. So, in order to switch to a different history, the client device may be configured to tune to a different frequency.

As discussed to maintain synchronization with the blockchain, it is necessary for the client device to receive all of the status updates. If reception is lost for an amount of time longer than the apnoea time, then it is not possible simply to resynchronize just by storing the information from the next RF broadcast signal which is received. Synchronization can only be maintained if the next RF broadcast signal which is received corresponds to a version of the RF broadcast signal which immediately follows the most recent RF broadcast signal for which information has been stored in the memory of the device.

When the client device has hopped to a subsequent history, there are at least two options for next steps, on the assumption that the client device will not further lose reception or connectivity. In a first case, the client device may be configured to continue to receive the RF broadcast signals in the same history. This is the preferable option for performance-constrained device with a limited service lifetime, but such that they can afford to keep a slightly out-of-date blockchain synchronization status. Specifically, in these cases, after the client device has stored the information about the $i^{th}$ state of the blockchain based on a signal from a subsequent history $H_k$ at a time $t_{i,k}$, the client device may then be configured to receive information about the $(i+1)^{th}$ state from the same history $H_k$ at a time $t_{i+1,k}$. More generally, in such cases, the client device may be configured to receive information about the $i^{th}$ state from the history $H_k$ at times $t_{i,k}$, where k>j, j representing the initial history.

In the second case, which is preferred in circumstances other than the above, after having stored the information from an RF broadcast signal in a subsequent history, the client device may be configured to continue to store information from RF broadcast signals in the original history until enough time passes that the missing information caused by the loss of connectivity has been collected. At that point, the client device may be configured to recombine the information in order to synchronize back with the blockchain, and then to continue to use the original history for synchronization. Until that point, the device will be synchronized with a past snapshot of the blockchain as from the history which it was using to maintain synchronization. In other words, after the device 102 has stored information about the $i^{th}$ state of the blockchain based on an RF broadcast signal from a subsequent history $H_k$ at a time $t_{i,k}$, the client device may be configured both to: at times $t_{i,m}$ receive information about later states of the blockchain from an earlier history $H_m$ where m<k and storing the information to the buffer 1032 of the memory; receive information about at least the $(i+1)^{th}$ state of the blockchain from the subsequent history $H_k$ at times $t_{n,k}$ where n={i+1, i+2 . . . } and storing the information to a memory; and when all of the information resulting from the missed transmissions has been obtained from the history $H_k$, combine the information received from the histories $H_k$ and $H_m$, thereby restoring synchronization, and continue to obtain information from the RF broadcast signals in the history $H_m$.

Preferably, the history $H_m$ is the original history $H_0$. In this way, once synchronization has been restored, the client device is once again receiving information from the original history. This is advantageous since it means that if there is a further loss of connectivity, there are more subsequent histories onto which the client device may "hop" in order to receive updates.

There may be a decision-making process in play in order to determine whether the client device is fully synchronized. Specifically, the client device may be configured to: (a) receive the signal which arrives earlier of: a next signal from the original history $H_0$, or a next signal containing information about the next unaccounted-for state of the blockchain, and store that information to a memory, and repeat this step until a next signal from the original history $H_0$ has been received; (b) determine whether information about all of the states of the blockchain up to the most recent state from the original history $H_0$ has been stored on the memory of the client device; (c) if so, re-synchronize with the original history $H_0$ such that subsequent signals, preferably all subsequent signals, are received from the original history $H_0$; and (d) if not, receive the signal which arrives earlier of: a next signal from the original history $H_0$, or a next signal containing information about a next unaccounted-for state of the blockchain, and storing that information to the memory, and repeat step (b) until a positive determination is returned.

In this context, "unaccounted-for" refers to a past state of the blockchain for which there is currently no information stored in a memory of the client device. Such information is necessary in order for the client device to be properly synchronized with the blockchain.

Once the client device is synchronized with the blockchain, it is configured to generate a registration request based on the information about the state of the blockchain, the registration request including a public key ID associated with the client device. At this point, it is worth noting that the blockchain in question is a blockchain which is associated with the ISP. Specifically, the ISP may have associated therewith an electronic address which is an electronic address of a blockchain wallet. Herein, the term "public key ID" is used to refer to any information or data pertaining to, and preferably uniquely identifying, a public key associated with the client device, or by extension the public key of a user of the client device. The public key ID may be the public key itself. It will be appreciated that by only sending a public key ID with the registration request, the client device is able to register with the ISP without the need for exchanging any of the user's personal information. This is advantageous in terms of the user's privacy and security, and prevents a user's personal information being obtained by malicious actors. In some cases, the registration request may represent details of a blockchain transaction to be made from a blockchain wallet associated with the client device (or user thereof) to the blockchain wallet located at the electronic access belonging to the ISP. In preferred cases, a cryptocurrency with anonymity features is used for transfer of funds, due to its excellent privacy properties. One such cryptocurrency is Monero, whose anonymity and privacy properties arise as a result of the use of ring signatures.

The registration request preferably includes authentication data. Authentication data is data which is used to preserve the integrity of the blockchain. In preferred cases, the authentication data comprises a deterministic transformation of the contents of the previous block in the blockchain, or a portion thereof. Preferably, the deterministic transformation is in the form of a hash. Authentication data may further comprise a signature which is generated using a private signature key associated with the client device from which the registration request is received. In some cases, the signature is generated by applying the private key to the contents of the previous block in the blockchain, or the deterministic transformation thereof. Herein, the public key which is included in the registration request may be the public verification key which corresponds to the private key which was used to sign the registration request. By using authentication data in this manner, the client device or user thereof is able to prove that they are synchronized with the blockchain, and also that they are who they claim to be.

We now consider how the validation process takes place. The ISP preferably includes, or has associated therewith, an access management system to manage access, via the satellite system, to the internet and associated services. Alternatively, the satellite system may include, or have associated therewith, the access management system.

Specifically, it is preferably that the ground station of the satellite system comprises the access management system. The access management system may comprise a request management system which is configured to receive the registration request from the satellite system (specifically, in cases in which the ground station of the satellite system includes the access management system, the registration request is received from the satellite itself of the satellite system). The request management module may be configured to determine whether the registration request received at the electronic address (i.e. the blockchain address) meets a validation criterion, wherein: if the request management module determines that the request received at the electronic provider address meets the validation criterion, it is determined that the request is a valid request; and if the request management module determines that the request received at the electronic provider address does not meet the validation criterion, it is determined that the request is not a valid request. In some cases, the request management system may be configured to determine whether a quantity associated with the registration request received at the electronic provider address is greater than or equal to a predetermined value, wherein: if the request management system determines that the quantity associated with the registration request received at the electronic provider address is greater than or equal to the predetermined value, it is determined that the registration request is a valid registration request; and if the request management system determines that the quantity associated with the registration request received at the electronic provider address is less than the predetermined value, it is determined that the registration request is not a valid registration request. In these cases, the validation criterion is that the quantity associated with the registration request is greater than or equal to the predetermined value. Systems according to this example are useful in enabling commercial transactions, e.g. via a blockchain, as discussed above.

The access management system of the ISP may further comprise an authorized client device management module, which is configured to add the public key ID to an authorized list if it is determined by the request management module (or other component) that the registration request is a valid registration request, wherein, as discussed, when a public key ID is on the authorized list, the client device or user thereof is permitted to access the internet via the satellite system.

The access management system may not only be configured to process a single registration request. Specifically, the request management module may be configured to determine whether each request of a plurality of registration requests received at the electronic address is a valid registration request, each of the registration requests including a respective public key ID associated with the client device from which the registration request is received. Furthermore, the authorized client management module may be configured to add the respective public key ID of the client device associated with each of the valid requests to the authorized list. In some cases if a registration request of a client device is not granted, then that client device may be placed on a waiting list (e.g. in the event that a threshold requirement to be placed on the authorized list is lowered). In this way, the access management system is able to deal with a plurality of registration requests. The access management system may be configured to deal with the requests one at a time, or simultaneously in a single parallel operation.

The preceding disclosure relates to a registration process, an outcome of which is essentially that, if a client device's registration request is successful, a public key ID associated with that client device is placed on an authorized list. However, while this may enable access to the internet via the satellite system, addition steps may be required in order for the client device actually to obtain the internet access. This connection process is the focus of the system of the second aspect of the invention. It will be appreciated that the client device, the satellite system and the ISP which form components of the system of the second aspect of the invention may be the same as their counterparts in the system of the first aspect of the invention. This will become evident when considering the third aspect of the invention, which combines the two. A second aspect of the invention provides a system for providing a client device in a remote location secure access to the internet via a satellite connection, the system including: a client device; a satellite system configured to provide the client device with access to the internet; and an internet service provider (ISP), wherein, during a connection process: the client device is configured to generate a connection request including a public key ID associated with that client device, and to transmit the connection request to the satellite system via an RF signal; in response to receiving the connection request, either: the satellite system is configured to determine whether the public key ID is on the authorized list; or the satellite system is configured to transmit the connection request to the ISP, and the ISP is configured to determine whether the public key ID is on the authorized list; and if it is determined that the public key ID is on the authorized list, the satellite system is configured to grant access to the internet via an internet access broadcast signal.

The components of the second aspect of the invention work together, once the client device is successfully registered, i.e. the public key associated therewith is present on the authorized list, actually to facilitate access to the internet. An authorization module (which may be part of the access management system) of the ISP may include an authorization module configured to perform the determination as to whether the public key ID is on the authorized list. The connection request may further include a public encryption key associated with the client device. In some cases, this may be the same public encryption key that was transmitted to the satellite system, to encrypt the synchronization session key. In other cases, it may be separate public encryption key. Including the public encryption key with a connection request rather than a registration request is advantageous since it reduces the amount of metadata which must be transmitted with the original registration request.

In response to receiving the connection request from the client device, the authorization module may be configured to determine whether the public key ID which is included in the connection request is included in the authorized list. In other words, the authorization module may be configured to verify whether the sender of the connection request is actually registered to access the internet via the satellite system. In those cases where the authorization module determines that the public key ID is included in the authorized list, the authorization module is subsequently configured to grant the client device access to the internet.

Internet access is preferably granted by availing the client device of a connection session key which may be used to access the internet. Specifically, the satellite system may be configured to transmit an internet access broadcast signal to the client device, the internet access broadcast signal containing the connection session key. It is desirable not simply freely to broadcast the connection session key, in case such a signal is intercepted by a malicious actor. Accordingly, the authorization module may be configured to grant the client device access to the internet by encrypting a connection session key with a public encryption key associated with the client device, to generate an encrypted connection session key, and sending the encrypted connection session key to the client device, the encrypted connection session key being decryptable by a user using a private decryption key which is complementary to the public encryption key, and the decrypted connection session key being usable to access the internet. It will be noted that the encryption key may be retrievable from either the connection request or the original registration request, in which case it is preferably stored to a memory of the access management system for later retrieval.

We now discuss what it means to "access the internet" in the present context. Essentially, any internet access involves a client device transmitting a request to an internet service provider, and the internet service provider responding by transmitting data back to the client device. In the case of internet access provided via a satellite system, the request and response simply travel via a satellite system on their way to their intended destination. In order to control internet access, according to the present invention, the data which is being transmitted from the ISP to the satellite is preferably encrypted, so that only client devices in possession of an appropriate session key are able to access the data. So, by providing this session key, a user is granted access to the internet, in the sense that they will be able to decrypt an encrypted signal from the satellite signal, the signal containing the data which forms the subject of their request.

The session key may be a one-use connection session key, allowing the user to access the internet a single time. For example, after the connection session key is used once, it may expire. In some cases in order to further heighten security, and also for increased control as to who is able to access the internet via the satellite system, the connection session key may be a rotating connection session key. In other words, the connection session key may be updated on a regular (preferably periodic) basis. Specifically, the connection session key may be a rotating connection session key which changes to a new connection session key after a predetermined period of time; and wherein, when the connection session key changes, the authorization module is configured to encrypt the new connection session key with the encryption key of each client device whose public key ID is included in the authorized list in order to generate a new encrypted connection session key, and to send the new encrypted connection session key to the or each client device.

In certain cases, the validation criterion which determines which subset of client devices who have made registration requests are placed on the authorized list may be variable. Specifically, the request management module may be configured to change the validation criterion. Such a change may result in certain client devices (or specifically, their registration request) now meeting the criterion, when they didn't before, or certain client devices whose registration requests previously met the criterion no longer meeting the criterion. After the validation criterion has been changed, the request management module may be configured to determine whether the registration requests of the client devices whose public key IDs are included in the authorized list meet the updated validation criterion, and to identify those which do not, i.e. the no-longer valid registration requests. The request management module may then be configured to generate instructions configured to cause the authorized client management module to remove the public key IDs associated with the client devices whose registration requests are no longer valid from the authorized list. On the other hand, the request management module may also be configured to determine whether the registration request of client devices who have been placed in the waiting list (see earlier) meet the updated validation criterion. For those that do, the request management module may be configured to generate instructions configured to cause the authorized client management module to add the public key IDs associated with those client devices onto authorized list. In this manner, the present invention provides an access management system which is able to dynamically manage the client devices which are able to access the internet via the satellite system while not requiring that individuals need to submit any personal information at all, nor to register with the service provider itself.

As discussed, a third aspect of the present invention provides a system for providing a client device in a remote location secure access to the internet via a satellite connect, the system including: a client device; a satellite system configured to provide the client device with access to the internet; and an internet service provider (ISP), wherein, during a registration process: the satellite system is configured to receive a first blockchain state signal which encodes information about a first state of a blockchain, and to generate and transmit a first RF broadcast signal encoding the information about the first state of the blockchain; the client device is configured to receive the first RF broadcast signal, to generate a registration request based on the information about the state of the blockchain, the registration request including a public key ID associated with the client device, and to be transmitted to an electronic address corresponding to a blockchain associated with the ISP, and to transmit the registration request to the satellite system; the satellite system is configured to receive the registration request, and to transmit it to the electronic address associated with the ISP; and the ISP is configured to determine whether the registration request is a valid request, and if the registration request is a valid request, to add the public key ID to an authorized list, wherein when a public key ID is on the authorized list, the client device or user thereof is permitted to access the internet via the satellite system, and wherein, during a connection process: the client device is configured to generate a connection request including a public key ID associated with that client device, and to transmit the connection request to the satellite system via an RF signal; in response to receiving the connection request, either: the satellite system is configured to determine whether the public key ID is on the authorized list; or the satellite system is configured to transmit the connection request to the ISP, and the ISP is configured to determine whether the public key ID is on the authorized list; and if it is determined that the public key ID is on the authorized list, the satellite system is configured to grant access to the internet via an internet access broadcast signal.

The optional features which have been set out above, in respect of the first aspect of the invention and the second aspect of the invention apply equally well to the third aspect of the invention, and are not repeated here, for conciseness.

The first, second, and third aspects of the invention relate to systems for providing a client device in a remote location with secure access to the internet. Fourth, fifth, and sixth aspects of the invention relate to corresponding methods.

Specifically, a fourth aspect of the invention provides a method of providing a client device in a remote location secure access to the internet via a satellite connection, the method comprising:

at a satellite system: receiving a first blockchain state signal which encodes information about a first state of a blockchain; and generating and transmitting a first RF broadcast signal encoding information about the first state of the blockchain;

at a client device: receiving the first RF broadcast signal; generating a registration request including a public key ID associated with the client device; and transmitting the registration request to the satellite system;

at the satellite system: receiving the registration request; and transmitting the registration request to an electronic address corresponding to a blockchain associated with an internet service provider (ISP); and at the ISP: determining whether the registration request is a valid registration request, and if the registration request is a valid request, adding the public key ID to an authorized list, wherein when a public key ID is on the authorized list, the client device or user thereof is permitted to access the internet via the satellite system.

A fifth aspect of the invention provides a method of providing a client device in a remote location secure access to the internet via a satellite connection, the method comprising:

at a client device: generating a connection request including a public key ID associated with the client device; and transmitting the connection request to the satellite system via an RF signal;

at a satellite system: receiving the connection request; either:

at the satellite system: determining whether the public key ID is on the authorized list; or at a satellite system: transmitting the connection request to an ISP, and at an ISP: determining whether the public key ID is present on the authorized list; and if it is determined that the public key ID is on the authorized list, at the satellite system: granting access to the internet via an internet broadcast signal.

A sixth aspect of the invention combines the fourth aspect of the invention and the fifth aspect of the invention, and provides a method of providing a client device in a remote location secure access to the internet via a satellite connection, the method comprising:

at a satellite system: receiving a first blockchain state signal which encodes information about a first state of a blockchain; and generating and transmitting a first RF broadcast signal encoding information about the first state of the blockchain;

at a client device: receiving the first RF broadcast signal; generating a registration request including a public key ID associated with the client device; and transmitting the registration request to the satellite system;

at the satellite system: receiving the registration request; and transmitting the registration request to an electronic address corresponding to a blockchain associated with an internet service provider (ISP);

at the ISP: determining whether the registration request is a valid registration request, and if the registration request is a valid request, adding the public key ID to an authorized list, wherein when a public key ID is on the authorized list, the client device or user thereof is permitted to access the internet via the satellite system;

at the client device: generating a connection request including a public key ID associated with the client device; and transmitting the connection request to the satellite system via an RF signal;

at the satellite system: receiving the connection request; either:

at the satellite system: determining whether the public key ID is on the authorized list; or at a satellite system: transmitting the connection request to an ISP, and at an ISP: determining whether the public key ID is present on the authorized list; and if it is determined that the public key ID is on the authorized list, at the satellite system: granting access to the internet via an internet broadcast signal.

The optional features set out in respect of the first, second, and third aspects of the invention apply equally well to the methods of the fourth, fifth, and sixth aspects of the invention, with method language replacing system language where appropriate.

Subsequent aspects of the invention relate to specific components of the system, and methods performed by those components. These aspects should not be regarded as exhaustive, and other combinations of features set out in this application are envisaged.

A seventh aspect of the invention provides a satellite system configured to facilitate secure internet access to a client device in a remote location via a satellite connection, the satellite system configured to: receive a first blockchain state signal, encoding information about a first state of a blockchain, and to generate a transmit a first RF broadcast signal encoding the information about the first state of the blockchain; receive a registration request from a client device, the registration request comprising a public key ID associated with the client device; transmit the registration request to an internet service provider which is configured to determine whether the registration request is a valid request, and if the registration request is a valid request, to add the public key ID to an authorized list, wherein when a public key ID is on the authorized list, the client device or user thereof is permitted to access the internet via the satellite system; receive a connection request from a client device; and either: determine whether the public key ID is on the authorized list, or transmit the public key to the ISP, the ISP configured to determine whether the public key ID is on the authorized list, wherein if it is determined that the public key ID is on the authorized list, the satellite system is configured to grant access to the internet via an internet access broadcast signal. The system may further comprise the ISP.

An eighth aspect of the invention provides a client device configured to access the internet securely from a remote location via a satellite connection, the client device configured to, from a remote location: receive an RF broadcast signal encoding information about a first state of a blockchain; generate a registration request based on the information about the state of the blockchain, the registration request including a public key ID associated with the client device, to be transmitted to an electronic address associated with the ISP; transmit the registration request to the satellite system for transmission to an ISP, the ISP configured to determine whether the registration request is a valid request, and if the registration request is a valid request, to add the public key ID to an authorized list, wherein when a public key ID is on the authorized list, the client device or user thereof is permitted to access the internet via the satellite system; generate a connection request including the public key ID; transmit the connection request to the connection request to the satellite system via an RF signal, for determination whether the public key ID is on the authorized list, wherein if it is determined that the public key ID is on the authorized list, the client device is configured to receive an internet access broadcast signal granting it access to the internet via the satellite system.

Optional features set out previously in respect of any of the first to third aspects of the present invention apply equally well to the seventh and eighth aspects of the invention.

A ninth aspect of the invention provides a method performed by a satellite system to facilitate secure internet access to a client device in a remote location via a satellite connection, the method comprising the steps of: receiving a first blockchain state signal, encoding information about a first state of a blockchain, and generating a transmit a first RF broadcast signal encoding the information about the first state of the blockchain; receiving a registration request from a client device, the registration request comprising a public key ID associated with the client device; transmitting the registration request to an internet service provider which is configured to determine whether the registration request is a valid request, and if the registration request is a valid request, adding the public key ID to an authorized list, wherein when a public key ID is on the authorized list, the client device or user thereof is permitted to access the internet via the satellite system; receiving a connection request from a client device; and either: determining whether the public key ID is on the authorized list, or transmitting the public key to the ISP, the ISP configured to determine whether the public key ID is on the authorized list, wherein if it is determined that the public key ID is on the authorized list, the method further comprises granting access to the internet via an internet access broadcast signal. The method may further comprise the steps carried out by the ISP.

A tenth aspect of the invention provides a method performed by a client device at a remote location in order to access the internet securely from the remote location, the method comprising: receiving an RF broadcast signal encoding information about a first state of a blockchain; generating a registration request based on the information about the state of the blockchain, the registration request including a public key ID associated with the client device, to be transmitted to an electronic address associated with the ISP; transmitting the registration request to the satellite system for transmission to an ISP, the ISP configured to determine whether the registration request is a valid request, and if the registration request is a valid request, to add the public key ID to an authorized list, wherein when a public key ID is on the authorized list, the client device or user thereof is permitted to access the internet via the satellite system; generating a connection request including the public key ID; transmitting the connection request to the connection request to the satellite system via an RF signal, for determination whether the public key ID is on the authorized list, wherein if it is determined that the public key ID is on the authorized list, the method further comprises receiving an internet access broadcast signal granting it access to the internet via the satellite system.

Optional features set out previously with respect to the first to third aspects of the invention apply equally well to the ninth and tenth aspects of the invention, with method language replacing system language as appropriate.

BRIEF DESCRIPTION OF THE DRAWINGS

Embodiments of the present invention will now be described with reference to the accompanying drawings, in which:

FIG. 4 is an example of a registration request.

DETAILED DESCRIPTION OF THE DRAWINGS

Aspects and embodiments of the present invention will now be discussed with reference to the accompanying figures. Further aspects and embodiments will be apparent to those skilled in the art. All documents mentioned in this text are incorporated herein by reference.

Figure 1:
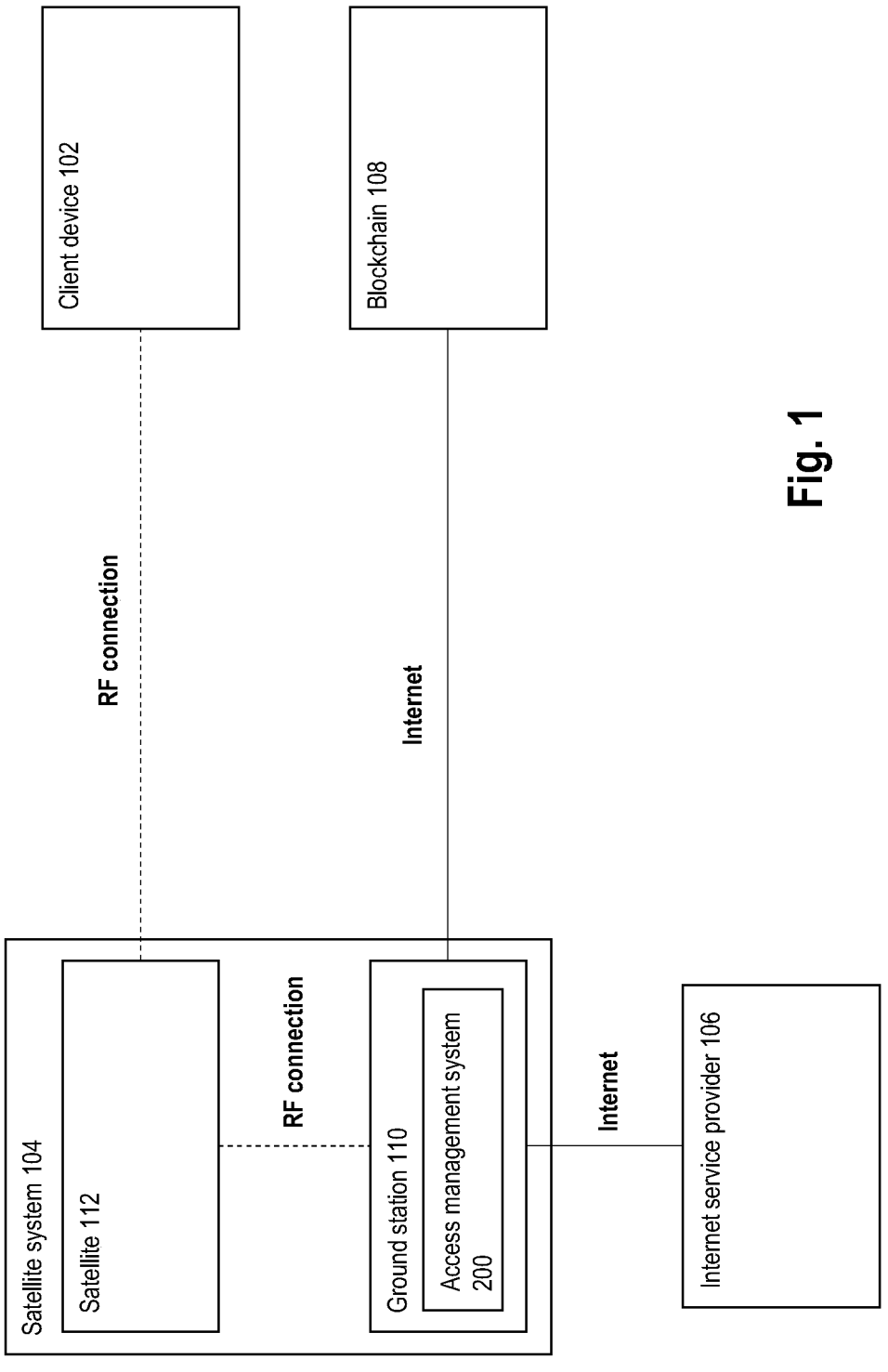
FIG. 1 is a high-level system diagram showing components of the first aspect of the invention.

FIG. 1 is a schematic diagram of a system 100 which may be configured to perform various aspects of the present invention. The system includes a client device 102, a satellite system 104, an internet service provider 106, and a blockchain node 108 (more specifically, a node which provides an access point to a blockchain-though throughout the present application, the term "blockchain" may be used as an abbreviation for convenience). The satellite system 104 comprises a ground station 110 and a satellite 112. As discussed earlier in this application, the satellite 112 may be a geosynchronous or Mid-Earth Orbit satellite. In the context of FIG. 1, it should be understood that the client device 102 is in a remote location, as defined earlier, i.e. that it has no conventional internet access (e.g. via a Wi-Fi network, or via cable), and it is therefore not shown to be directly connected to the ISP 106. The client device 102 is connected to the satellite 112 via an RF connection (i.e. 30 Hz to 300 GHz). Similarly, the satellite 112 is connected to the ground station 110 via an RF connection, and the ground station 110 is connected to the ISP 106 via the internet (in any way, e.g. via a cellular network, a Wi-Fi network, or via cable). The blockchain node 108 is also connected to the satellite system 104 (specifically, the ground station 110 thereof) via the internet, so that it is able to transmit updates about the state of the blockchain thereto. The blockchain node 108 may also be connected to the IPS 106.

FIGS. 2, 3A, 6, 8A, and 9 show high-level flow diagrams of how a user of the client device 102 may connect securely to the internet via the satellite system 104 using the system 100 shown in FIG. 1. More details related to each step will be set out later on with reference to the remaining drawings.

As a precursor to the steps of the present invention, a user of the client device 102 must acquire a dish antenna, and install the necessary software on the client device 102, i.e. a blockchain client (such as a Monero client and a satellite connection client). Then, the user of the client device 102 must synchronize with the blockchain 108. Then, the user of the client device 102 may deposit funds in an electronic blockchain wallet. All of these steps must be performed from a non-remote location, in order to set the user up. At this point, the user of the client device 102 is then able to access the internet via the satellite system 104 from a remote location.

Figure 2:
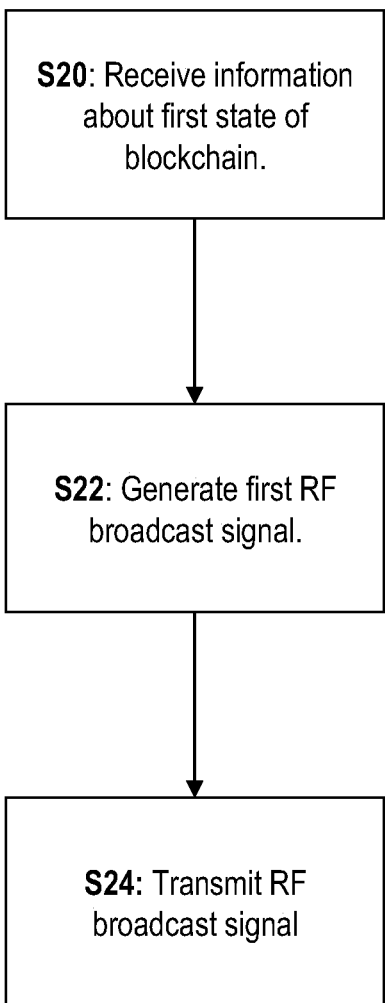
FIG. 2 is a flowchart illustrating a process by which an RF broadcast signal encoding information about a current state of a blockchain is generated.

In step S20 of FIG. 2, the satellite system 104 receives a first blockchain state signal which encodes information about a first state of the blockchain 108. The signal may be received e.g. at the ground station 110 via the internet, or may be received from the ISP 106. It is preferable, however, that the signal is received at the satellite 112 itself, e.g. from some broadcast station associated with the blockchain 108, or the ISP 106. Then, in step S22, the satellite system 104 is configured to generate a first RF broadcast signal which encodes the information about the first state of the blockchain. Preferably, this is performed by the satellite 112. Then, immediately after in step S24, the satellite system 104 may transmit the generated first RF broadcast signal encoding information about the first state of the blockchain. Preferably, steps S22 and S24 are performed by the satellite 112 itself, i.e. the satellite 112 simply acts as a relay, which receives the blockchain state signal and transmits it. This particular scenario should be understood to be covered by the steps of generating and transmitting. It is considered to be implicit, by its very nature as a satellite, that satellite 112 comprises at least a receiver, a processor, and a transmitter for performing steps S20, S22, and S24 respectively.

Figure 3A:
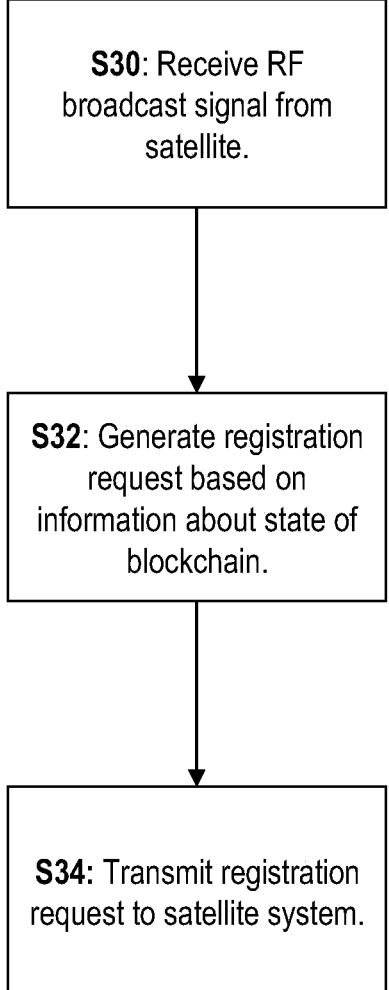
FIG. 3A is a flowchart illustrating a process by which a registration request is generated.

FIG. 3A shows a set of steps which are subsequently performed by client device 102. It should be stressed, that at this point, the user of the client device 102 may have travelled to a remote location in which they are unable to connect to the internet using conventional means. It should also be understood that they user has set up the antenna, which is capable of receiving RF broadcast signals from the satellite 112. In step S30, the client device 102 receives the RF broadcast signal from the satellite 112, which contains the information regarding the first state of the blockchain 108. As will be discussed in more detail later on, it is possible (likely, in fact) that, while travelling between the non-remote and remote locations, the client device 102 loses internet connectivity. For this reason, it may be necessary to receive a plurality of RF broadcast signals to ensure that the client device 102 is synchronized with the blockchain 108. It is necessary for the device to be fully synchronized with the blockchain 108 in order to ensure integrity. It is important to note that the client device 102 does not yet have internet connectivity, the information about the state of the blockchain 108 is received from the satellite via a plurality of RF broadcast signals, and not via the internet.

Figure 3B:
FIG. 3B is a timing diagram illustrating the retransmission of signals in different histories.
Figure 3B:
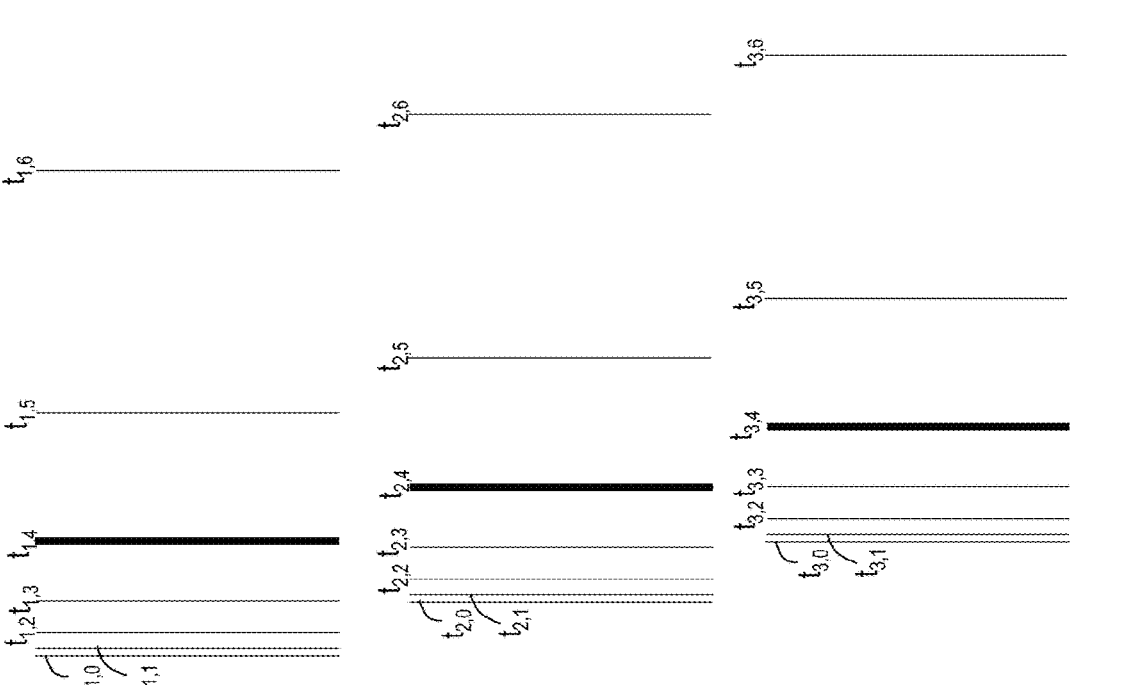

We now consider in more detail the process by which it is ensured that the client device 102 attains synchronization with the blockchain 108, even in the event that several updates are missed, e.g. while the user of the client device 102 travels from the non-remote to remote location. FIG. 3B shows a timing diagram including a plurality of times $t_{i,j}$, illustrating the above. In FIG. 3B, each vertical line represents a time at which an RF broadcast signal is sent. The top row represents signals corresponding to the first state of the blockchain (i.e. i=1), the second row represents signals corresponding to the second state of the blockchain (i.e. i=2), and the bottom row represents signals corresponding to the third state of the blockchain (i.e. i=3). There are a plurality of signals within each row; these represent the subsequent histories, i.e. the retransmissions of each original RF broadcast signal. Across the three signals, those signals which are transmitted at times with the same j value are signals in the same history.

Figure 3C:
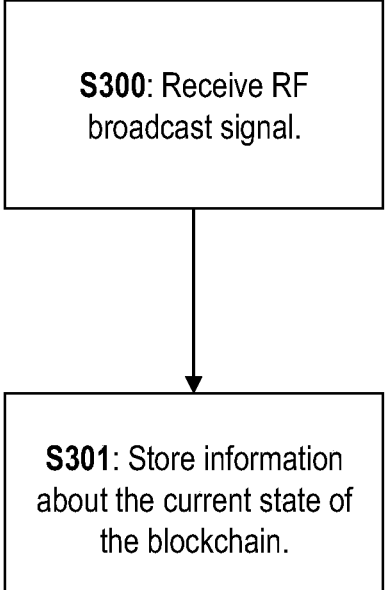
FIG. 3C is a flowchart illustrating a process by which information about the current state of the blockchain is stored by the client device.

We now consider the steps which are performed by the device 102 itself in order to remain synchronized. Here, by "remain synchronized", we mean that the client device 102 has available to it, e.g. on a buffer the information about the current (or most recent) state of the blockchain 108, which enables it, where necessary, to write new information to it, via the blockchain node 108. It must be stressed that, for security purposes relating to the generally immutability of blocks in a blockchain, in order to remain synchronized with the blockchain, the client device 102 must possess information about the current state and all previous states. It is insufficient only to possess information about the most recent state. FIG. 3C shows a simple case in which the client device 102 does not lose any connectivity, and therefore is able simply to receive all of the RF broadcast signals the first-time round. In step S300, the RF receiver 1023 of the client device 102 receives an RF broadcast signal from the RF broadcast station 104. As discussed, the RF broadcast signal encodes information about the current state of the blockchain 106. Then, in step S301, the client device 102 stores the information about the current state of the blockchain in a memory, for example in a buffer of the memory.

Figure 3D:
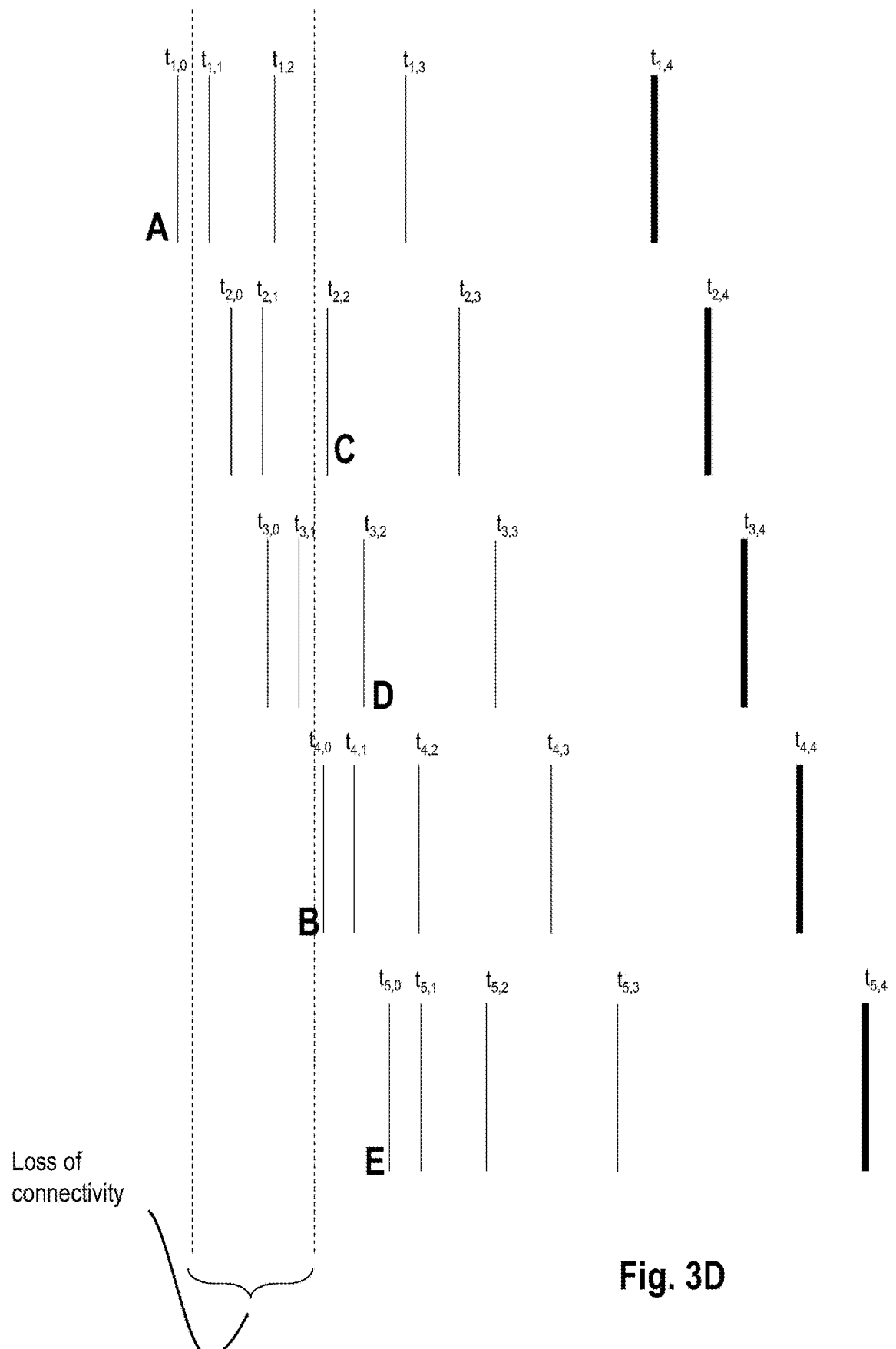
FIG. 3D is another timing diagram illustrating a process by which a client device loses connectivity and then resynchronizes with the blockchain after connectivity is restored by receiving signals from different histories.

The case where the client device 102 misses a transmitted RF broadcast signal is explained in detail in the "Summary of the Invention" section of this patent application. We now illustrate this process with reference to FIG. 3D, which shows an example of the process by which synchronization with the original history $H_0$ is resumed. To recall, at a time $t_{i,j}$, the first subscript represents the number of the signal, and the second subscript represents the number of the history.

In a first step, a signal A containing information about the first state of the blockchain is received at time $t_{1,0}$ from the original, main history, $H_0$.

Then, as illustrated by the pair of dashed lines, there is a loss of connectivity. It is not possible to receive any signals during the loss of connectivity.

The reader will recall that once connectivity is resumed, the client device 102 receives not only the signals on the history onto which it has "hopped", but also the signals from the original history $H_0$ (or any earlier history). With this in mind, immediately after connectivity resumes signal B is received at $t_{4,0}$. This is in fact the signal containing information about the fourth state of the blockchain, but it is stored in the buffer of the client device 102. At this point a determination takes place as to whether information pertaining to every state of the blockchain up to the most recent (i.e. the fourth state) has been received. In this case, it has not, since no information has been received about the second and third states of the blockchain.

Recalling that it is necessary to receive information about every state of the blockchain up to the most recent in order to maintain synchronization with the blockchain, it is therefore necessary to receive information regarding the second and third states of the blockchain as well. So, in a next step, a signal C containing information about the second state of the blockchain is received at time to: on the history $H_2$. At this point, another determination takes place as to whether information regarding every state of the blockchain up to the most recent (i.e. still the fourth) has been received. As above, this is still not the case, since no information regarding the third state of the blockchain has yet been received.

In a next step, a signal D is received at time $t_{3,2}$, again from the history $H_2$, which contains information about the third state of the blockchain. A further determination takes place, and at this point, it is determined that information about all states of the blockchain up to the fourth and most recent has now been received. Accordingly, the client device 102 hops back to receiving signals from the original history $H_0$, the next being signal E containing information about the fifth state of the blockchain, at time $t_{5,0}$.

Figure 3E:
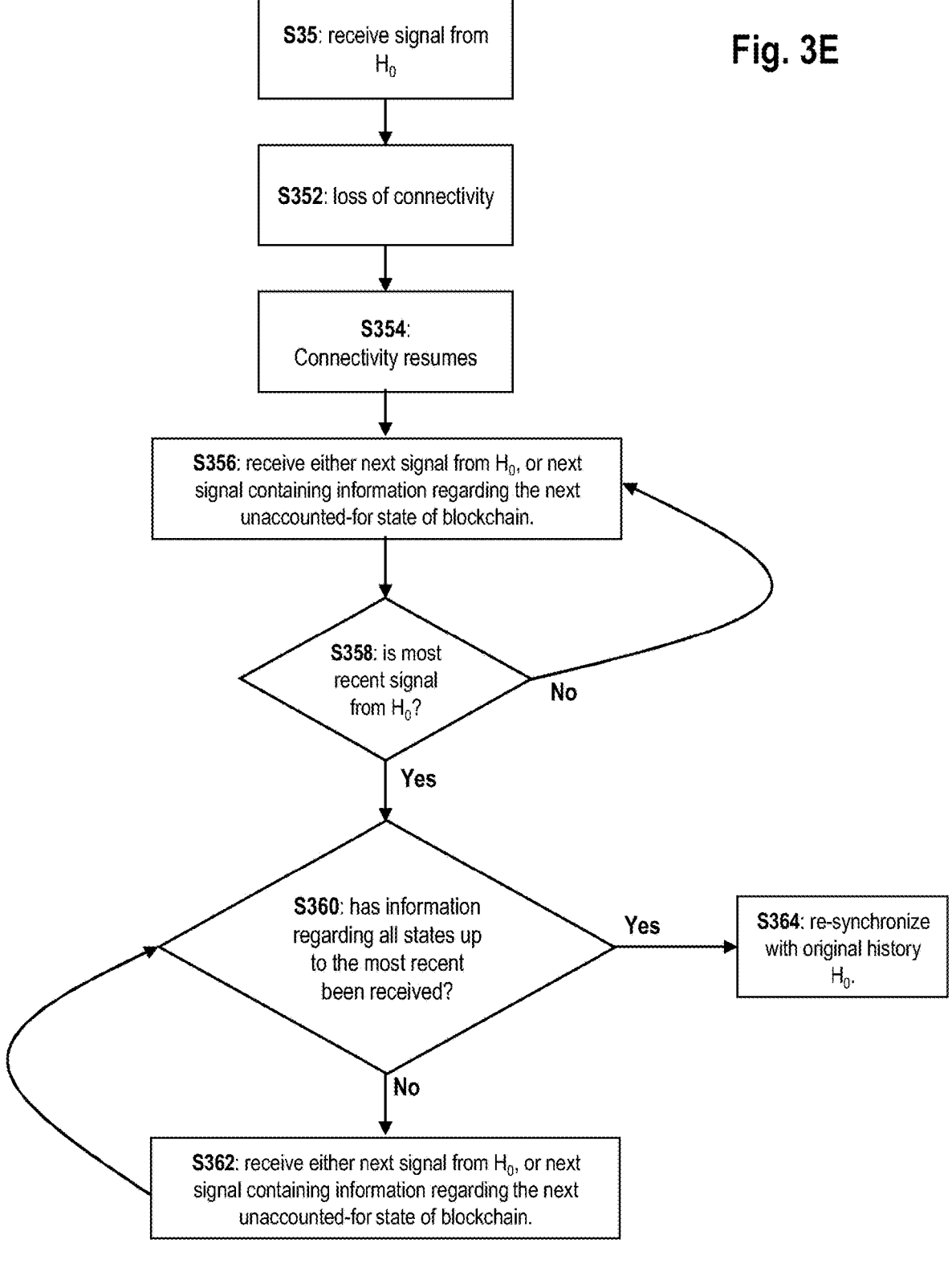
FIG. 3E is a flowchart illustrating a decision process which takes place in order to resynchronize with the blockchain after connectivity is restored.

FIG. 3E is a flowchart demonstrating a general decision-making process which is employed by the client device 102 to re-synchronize with the main history $H_0$ after a loss of connectivity. It will be noted, however, that it is equally feasible that the client device 102 could synchronize with an earlier (but not main) history.

In a first step S350, the client device 102 receives a signal from the main history $H_0$ at a time $t_{x,0}$. Then, in step S352, there is a loss of connectivity, which lasts until step S354, when connectivity is resumed. In a next step S356, the client device receives the next signal arriving at either time $t_{y,0}$ (i.e. the next signal on the original history $H_0$ which arrives, pertaining to any $y^{th}$ state of the blockchain), or $t_{x+1,z}$ (i.e. the earliest signal arriving which contains information about the $(x+1)^{th}$ state of the blockchain on any history $H_z$). In response to receiving the additional signals, the client device 102 is then configured to store the information in a memory, preferably a buffer thereof. This step S356 is repeated until the next signal from the original history $H_0$ (representing some $y^{th}$ state of the blockchain is received) at a time $t_{y,0}$. In other words, at step S358, it is determined whether the most recent signal received is from the history $H_0$, at a time $t_{y,0}$. The reason for this repetition is that, if a signal from the history $H_0$ is not received, then the client device 102 may not "know" what the most recent state of the blockchain is. If the result of the determination of step S358 is "no", the process returns to step S356. If so, determination step S360 takes place, in which it is determined whether information regarding all states of the blockchain up to the most recent state (in this case $y^{th}$) has been received, in other words, all states from (x+1) to y. If not, the process proceeds to step S362, in which either the next signal is received from $H_0$, or a signal representing the next unaccounted-for state of the blockchain is received. After this step S362, the process returns to step S360. If the outcome of step S360 is positive (i.e. information regarding all states of the blockchain up to the most recent state has been received), then the client device 102 resynchronizes with the original history $H_0$ in step S364, and receives all signals from the original history in future.

Having synchronized to the blockchain 108, in step S32 the client device 102 generates a registration request 10 based on the information about the state of the blockchain (preferably the most recent state of the blockchain), and including a public key ID (which could be a public verification key) associated with the client device 102. The registration request 10 is preferably signed using a private signature key of the client device 102 (which can be verified using the public verification key contained in the request). An example of a registration request 10 is shown in FIG. 4. Registration request 10 may include a payload 12, a signature 14, and metadata 16. The metadata 16 may include a client address 18, which indicates to the request management module 105 where e.g. notifications and other data intended for a given client device 102 should be sent. The metadata may further include an ID relating to the public key 20. This is an important feature, since it is the ID relating to the public key 20 which is stored on the authorized list 110 (see later in this application) in order to confirm that the client device 200 associated with that ID is permitted to access the internet via the satellite system 104. In alternative cases, instead of the metadata 16 of the registration request 10 including an ID related to the public key of the client device 102, it may include the public key itself-both approaches are valid, and throughout this application, where we refer to an ID relating to the public key 20, a public key ID, or the like, it should be understood that the term is interchangeable with just the public key, unless context dictates otherwise. Finally, the metadata 16 may include an encryption key 22. In cases where the registration request 10 includes an encryption key 22, it is preferably stored e.g. by the registration request module 105 in the registration data 112 of the memory 104 of the access management system 100 in association with the ID related to the public key 20.

The signature 14 is preferably generated using a private signature key associated with the client device 102 or a user thereof. This means that the signature may be verified using e.g. the public verification key which is also included in the registration request 10.

Figure 5:
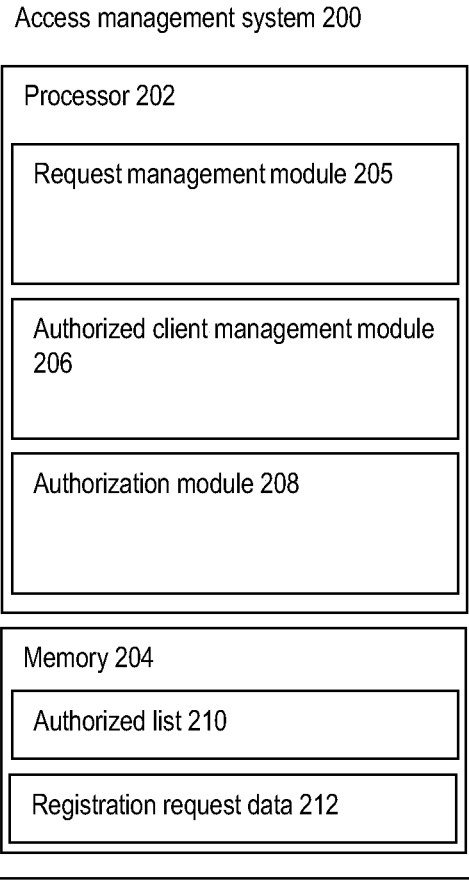
FIG. 5 is an example of an access management system.

Having generated the registration request 10, the client device 102 then transmits it, in step S34, to the satellite 112. At this point, the satellite 112 may transmit it to the ground station 110. The ground station 110 may then, optionally, transmit it to the ISP 106, for the next processing step. The next processing step is performed by an access management system 200, an example of which is shown in FIG. 5. The access management system 200 may be located on the ground station 110 of the satellite system or at the ISP 106. Before discussing its operation, we describe the structure of the access management system 200 in more detail. The access management system 100 may include a processor 202 and a memory 204. The processor 202 may include a request management module 205, an authorized client management module 206, and an authorization module 208. The memory 104 may include an authorized list 210, and registration data 212.

Figure 6:
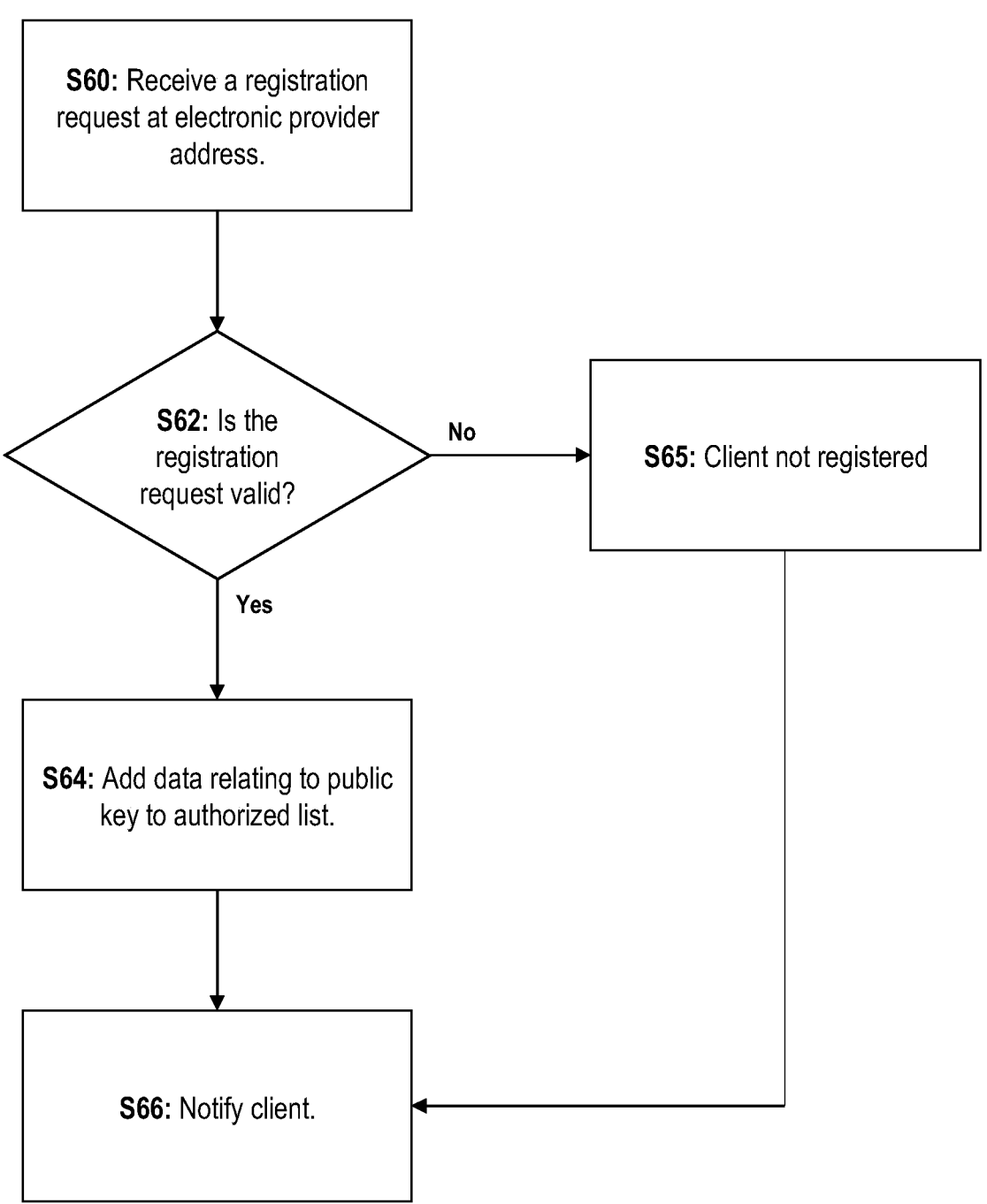
FIG. 6 is a flowchart illustrating a process by which a registration request is validated (or not).

FIG. 6 shows what happens after the registration request is received by the access management system 200 (either at the ground station 110 or the ISP 106). Upon receiving the registration request 10 in step S60, the request management module 205 may determine whether the registration request 10 is a valid request, in decision step S62. In the event that the registration request 10 is valid, the authorized client management module 206 may in step S64 then add the public key 20 associated with the client device 102 from which the registration request 10 was received to the authorized list 210. The authorized list 210 preferably includes a list of client devices 102 who are permitted to access the internet via the satellite system 104 based on the results of the determination in step S62. If it is determined in step S62 that the registration request 10 is not a valid request, the client device 102 from which the registration request 10 was received may not be registered, i.e. the public key ID will not be added to the authorized list 210 (step S65). Then, in both cases (i.e. registered and not registered), the user may be notified of the result in step S66, at the client address 18 in the metadata 16 of the registration request 10.

Figure 7:
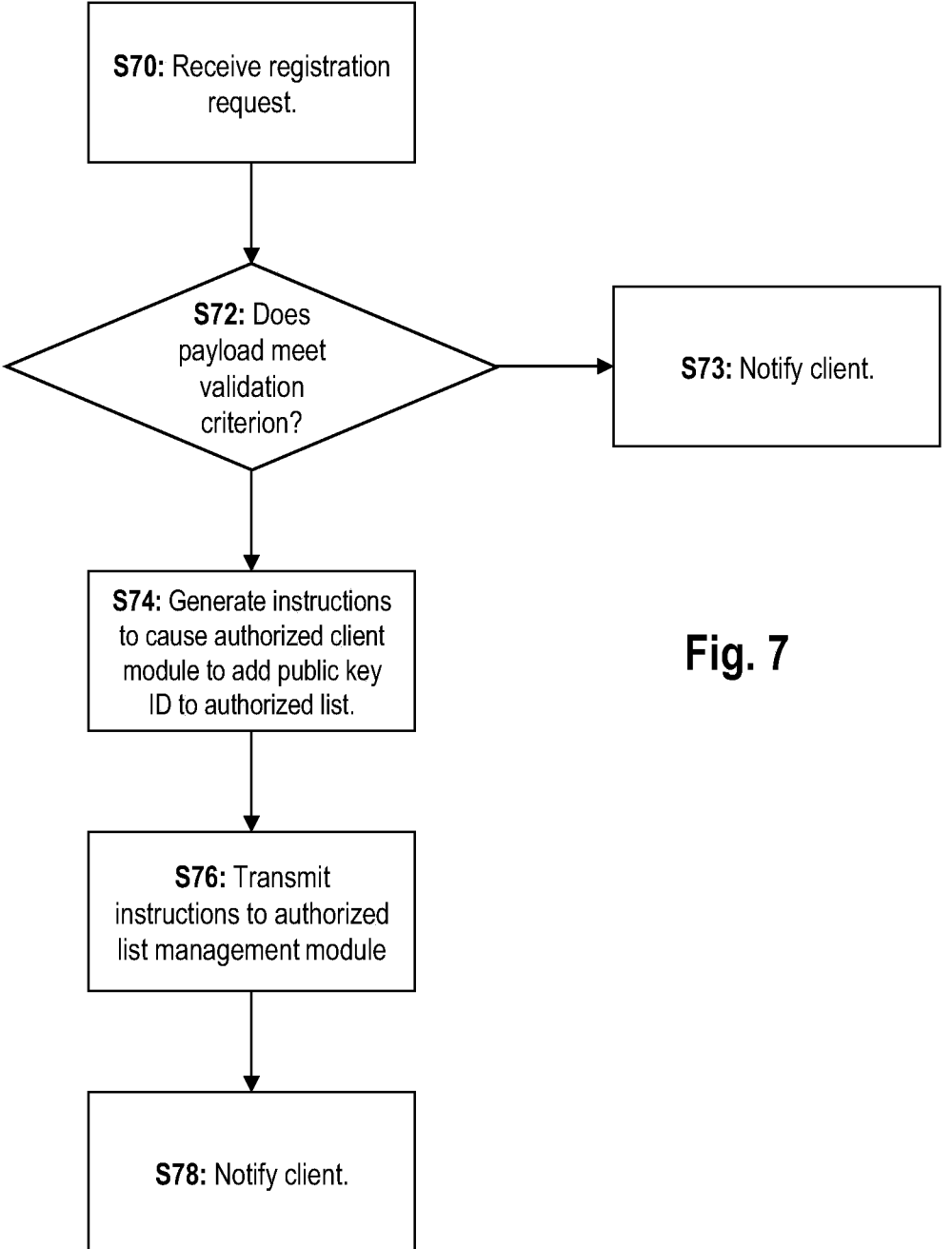
FIG. 7 is a flowchart illustrating a more detailed process by which a registration request is validated (or not).

FIG. 7 shows more detail of the process performed by the request management module 205. In step S70, the registration request 10 may be received, e.g. at an electronic blockchain wallet 400 or the request management module 205 itself. Then, in step S72, the request management module 205 may determine whether the payload 12 of the registration request 10 meets some predetermined validation criterion. The electronic blockchain wallet is preferably associated with the ISP 106. In such cases, the payload 12 may indicate the amount of funds to be transferred from the client device 102 to the blockchain wallet of the ISP 106. In such cases, the validation criterion may include a cost associated with access to the internet via the satellite system 104, and the request management module 205 may be configured to compare the amount of funds indicated in the payload 12 with the cost. If it is determined that the payload 12 does not match the validation criterion, the client device 102 from which the registration request 10 was received may not be registered on the system, and they may be notified accordingly in step S73. Conversely, if it is determined that the payload 12 does meet the validation criterion, then the requestion management module 205 may, in step S74, generate instructions which cause the authorized client module 206 to add the public key ID 20 from the registration request to the authorized list 210 in memory 204, and transmit the instructions accordingly in step S76. The request management module 205 may then notify the user accordingly. In some cases, the request management module 205, or the processor 202 of the access management module 200 more generally may include a notification module (not shown) which may be configured to generate and transmit notifications.

Figures 8A, 8B:
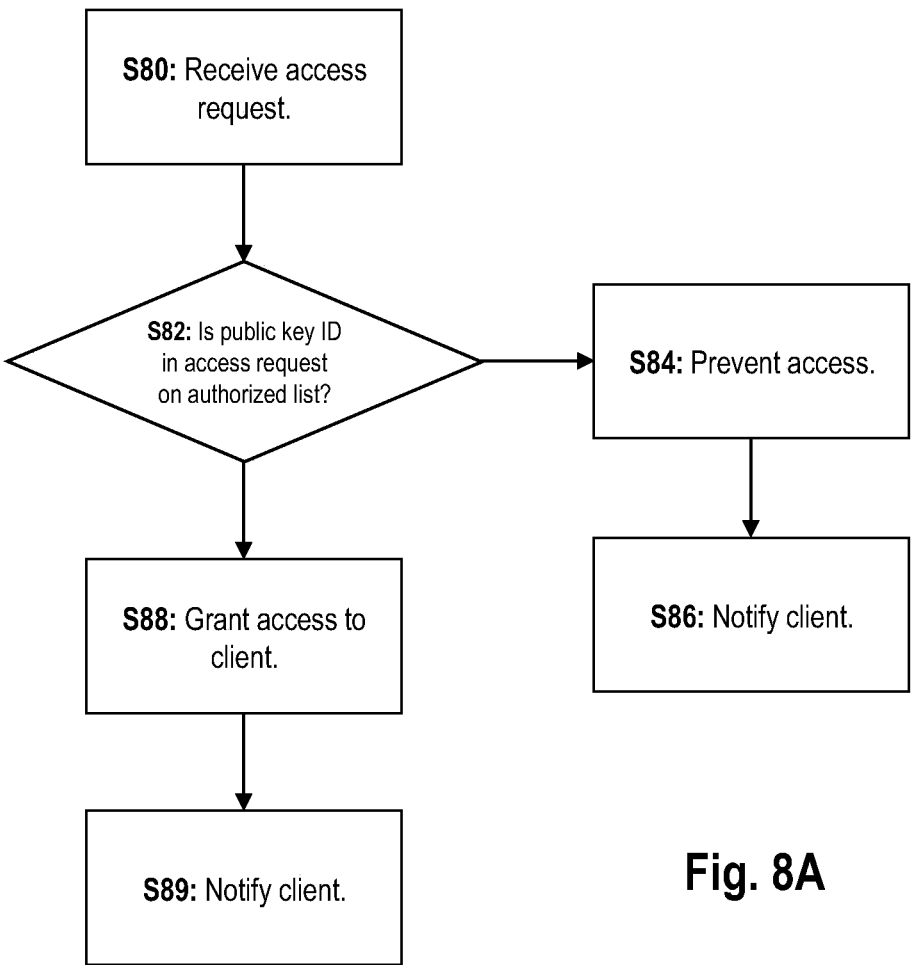
FIG. 8A is a flowchart illustrating a connection request process.
FIG. 8B is an example of a connection request.

The processes outlined above relate to the initial registration of a client device 102 with the ISP 106 via the access management module 100. Once a client device 104 is registered, the user thereof (or, for that matter, a user who is not registered) may then wish to access the internet via the satellite system 104. In order to do so, a connection request is generated and sent to the access management system 200. FIG. 8A shows an example of a process which may be performed to process the connection request. In step S80, the access management system 200, preferably the authorization module 208 thereof, may receive a connection request 50. FIG. 8B shows an example of a connection request 50, which may optionally include data 52 identifying the ISP 106, a public key ID 20 associated with the client device 102, and an encryption key 22 associated with the client device 200. In cases in which the encryption key 22 is included in the client device 102's original registration request 10, then it is not necessary for the connection request 50 to include the encryption key 22. It should be noted that FIG. 8B is not exhaustive—the connection request 50 may include other data as well. In step S82 of FIG. 8A, the authorization module 208 may determine whether the public key ID included in the connection request 50 is present in the authorized list 210. If not, then access by the client device 102 to the internet via the satellite system 104 is prevented in step S84, and in step S86 a notification is sent accordingly. If the public key ID 20 is included in the authorized list 210, then the authorization module 208 grants the client device 102 access to the electronic resource in step S88, and notifies them accordingly in step S89.

Figure 9:
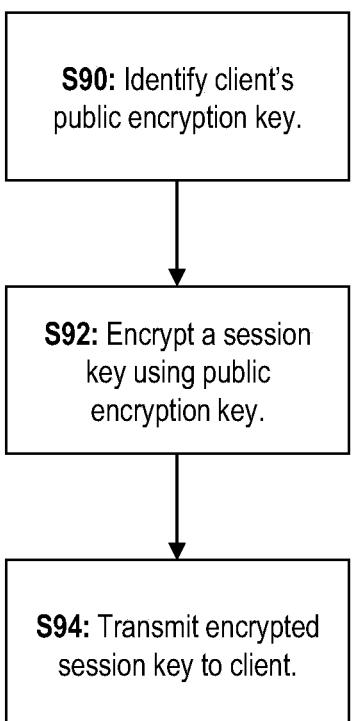
FIG. 9 is a flowchart illustrating a process by which access to the internet via a satellite system may be granted.

We now consider how the client device 200 maybe authorized to access the internet via the satellite system 104, and how access is actually granted. An exemplary process is shown in FIG. 9. Essentially, when a client device 102 is granted access to the internet via the satellite system 104, they are provided with a session key which enables them to decode data which is transmitted from the ISP 106 via the satellite 112. In step S90, the encryption key 22 associated with the client device 102 in question is identified. For example, if the encryption key 22 was initially delivered in the registration request 10, and stored in the registration request data 212, then the authorization module 208 may perform a lookup in the registration request data 212 to identify the encryption key 22 associated with the public key ID 20 which was present in the connection request 50.

Alternatively, in a simpler case, if the encryption key 22 formed part of the connection request 50, then the encryption key 22 may simply be retrieved therefrom. Once the encryption key 22 has been identified, the authorization module 208 (or optionally an encryption module, not shown, thereof) may then encrypt the session key using the encryption key 22 in step S92. It should be noted, for completeness, that data which is encrypted using the encryption key 22 is decryptable by a private decryption key which is possessed only by the client device 102, in order to ensure that only that client device 102 is able to access the session key which is encrypted using their own (public) encryption key 22. Once the session key has been encrypted, the encrypted session key may then, in step S94, be transmitted to the client device 102, at which point the client device 102 may decrypt the session key, and use the session key to access the internet via the satellite system 104, i.e. by decoding data which is received from the satellite 112. Thus, access is granted to the internet via the satellite system 104. In some cases, as discussed elsewhere, rather than generating encrypted session keys using the respective encryption key 22 of each client device 102, a broadcast encryption scheme may be used.

Figure 10:
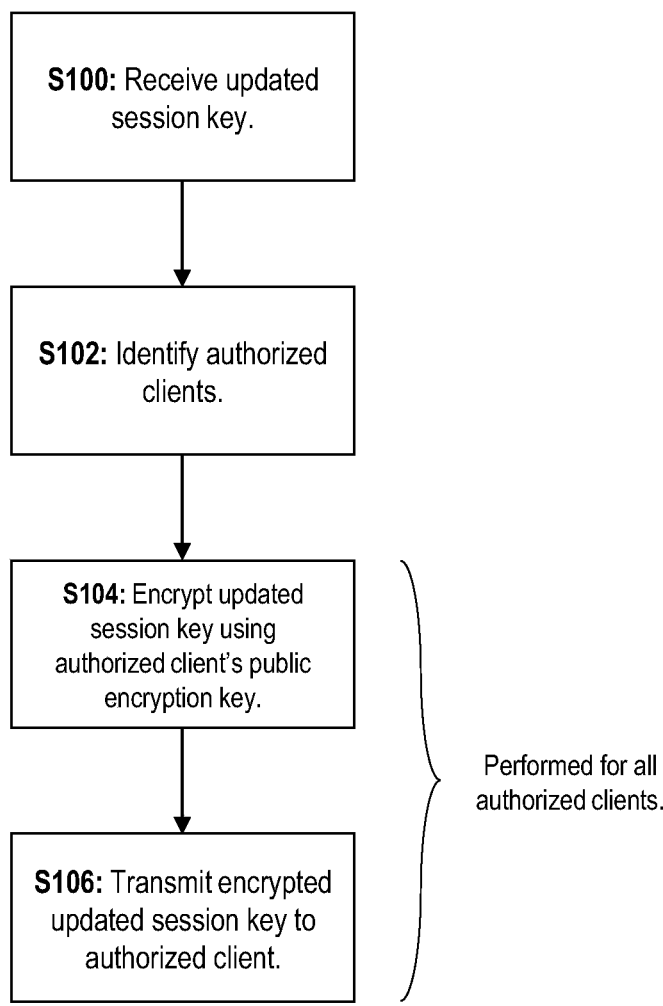
FIG. 10 is a flowchart illustrating a process by which the session key may be updated.

For added security, the session key may change on a regular, preferably periodic basis. The session key may change every minute, or hourly, or may change a plurality of times per day. It may change daily, may change every 2, 3, 4, 5, or 6 days. The session key may change weekly, or monthly. The frequency with which the session key changes is preferably based on the intended application. Of course, if the session key changes, then it is necessary to keep the registered client devices 200 updated as well, in order to ensure that they remain able to access the electronic resource. This process is illustrated in FIG. 10. In a first step S100, the authorization module 208 may receive the updated session key. Alternatively, the authorization module 208 may generate the updated session key itself. The process by which the session key is generated is preferably random. Then in step S102, the authorization module 208 may identify all authorized client devices 102, i.e. those client devices 102 whose public key ID 20 is present on the authorized list 210. Once these authorized client devices 102 have been identified, the authorization module 208, for each authorized client device 102, may encrypt the updated session key in step S10, using the client device's encryption key 22 (this may be obtained as outlined in the previous paragraph). Finally, in step S106, the encrypted updated session key may be transmitted to the authorized client device 102. In some cases, as discussed elsewhere, rather than generating encrypted updated session keys using the respective encryption key 22 of each authorized client device 200, a broadcast encryption scheme may be used.

Figure 11:
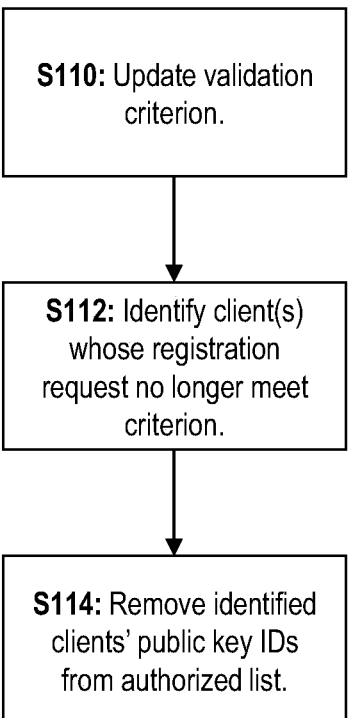
FIG. 11 is a flowchart illustrating a process by which a validation criterion may be updated.

In some cases, it may be desirable to change the validation criterion. For example, in a commercial setting, this may be done in order to alter the price of accessing the internet via the satellite system 104. The present invention provides a means of doing so. FIG. 11 shows an outline of a process by which the authorized list 210 can be updated based on a change in a validation criterion. In a first step S110, the validation criterion may be updated, e.g. by the request management module 205. This may correspond to an increase in the price for accessing the internet via the satellite system 104. Then, in step S112, those client devices 102 the content of whose registration requests 10 no longer meet the validation criteria are identified. This may be achieved, for example, by the registration management module 205 re-evaluating all of the registration requests 10

(preferably the payloads 12 thereof), which may be stored in e.g. the registration request data 212 in association with the public key ID. Having identified the public key IDs 20 of the no-longer-permitted client devices 102, the authorized client management module 206 may then remove these public key IDs 20 from the authorized list 110. How, then, do these client devices 102 actually lose access to the internet via the satellite system 104? In some cases, for example, the client device 102 may send a connection request 50, which will then be denied by the authorization module 208 because the public key ID is no longer on the authorized list. Alternatively, in cases where the session key changes, the client device 102 will not be sent an updated session key because they are only sent to client devices 102 on the authorized list 210.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

The invention claimed is:

1. A system for providing a client device in a remote location secure access to the internet via a satellite connection is provided, the system including:
   a client device;
   a satellite system configured to provide the client device with access to the internet; and
   an internet service provider (ISP), wherein the ISP or the satellite system comprises an authorization module, wherein, during a registration process:
   the satellite system is configured to receive a first blockchain state signal which encodes information about a first state of a blockchain, and to generate and transmit a first RF broadcast signal encoding the information about the first state of the blockchain;
   the client device is configured to receive the first RF broadcast signal, to generate a registration request, the registration request including a public key ID associated with the client device and a deterministic transformation of contents of at least a portion of a previous block of the blockchain, and to be transmitted to an electronic address corresponding to a blockchain associated with the ISP, and to transmit the registration request to the satellite system;
   the satellite system is configured to receive the registration request, and to transmit the registration request to the electronic address associated with the ISP;
   the ISP is configured to determine whether the registration requestis a valid request, and based on the registration request being a valid request, to add the public key ID to an authorized list, wherein public key IDs on the authorized list indicate client devices that are permitted to access the internet via the satellite system; and
   the authorization module is configured to grant the client device access to the internet by encrypting a connection session key with a public encryption key associated with the client device, to generate an encrypted connection session key, and sending the encrypted connection session key to the client device, the encrypted connection session key being decryptable by using a private decryption key which is complementary to the public encryption key, and the decrypted connection session key being usable to access the internet.

2. The system of claim 1, wherein:
the electronic address is an electronic address of a blockchain wallet associated with the ISP;
the registration request includes authentication data comprising a signature generated using a private signature key of the client device from which the registration request is received; and
the public key ID is a public verification key which corresponds to the private signature key used to generate the signature.

3. The system of claim 1, wherein:
the ISP or the satellite system includes, or has associated therewith, an access management system to manage access, via the satellite system, to the internet, the access management system comprising a request management system configured to:
receive the registration request from the satellite system or a satellite of the satellite system; and
determine whether the registration request received at the electronic address meets a validation criterion, wherein:
   in response to the request management system determining that the registration request received at the electronic address meets the validation criterion, the request management system is configured to determine that the registration request is a valid request; and
   in response to the request management system determining that the registration request received at the electronic address does not meet the validation criterion, the request management system is configured to determine that the registration request is not a valid request.

4. The system of claim 1, wherein:

the satellite system is configured to transmit an $i^{th}$ RF broadcast signal at a time $t_{i,0}$, and re-transmit the $i^{th}$ RF broadcast signal a plurality N times, where a $j^{th}$ re-transmission takes place at $t_{i,j}$.

5. The system of claim 4, wherein:

after missing a transmission of the $i^{th}$ RF broadcast signal at a time $t_{i,0}$, the client device is configured to:

receive a retransmitted version of the $i^{th}$ RF broadcast signal from a subsequent history $H_m$ at a time $t_{i,m}$ where m>0, the retransmitted version of the $i^{th}$ RF broadcast signal encoding information about an $i^{th}$ state of the blockchain; and store the information about the $i^{th}$ state of the blockchain in a memory of the client device.

6. The system of claim 1, wherein:

the registration request comprises a public encryption key associated with the client device.

7. A system for providing a client device in a remote location secure access to the internet via a satellite connection, the system including:

a client device;

a satellite system configured to provide the client device with access to the internet; and an internet service provider (ISP), wherein the ISP or the satellite system comprises an authorization module, wherein, during a connection process:

the client device is configured to generate a connection request including a public key ID associated with that client device, and to transmit the connection request to the satellite system via an RF signal;

in response to receiving the connection request, the satellite system is configured to transmit the connection request to the ISP, and the ISP is configured to determine whether the public key ID is on an authorized list;

in response to determining that the public key ID is on the authorized list, the satellite system is configured to grant access to the internet via an internet access broadcast signal and forward data between the client device and a remote computing system; and the authorization module is configured to grant the client device access to the internet by encrypting a connection session key with a public encryption key associated with the client device, to generate an encrypted connection session key, and sending the encrypted connection session key to the client device, the encrypted connection session key being decryptable by using a private decryption key which is complementary to the public encryption key, and the decrypted connection session key being usable to access the internet.

8. The system of claim 7, wherein:

the connection session key is a rotating session key.

9. The system of claim 7, wherein:

the connection request comprises the public encryption key associated with the client device.

10. The system of claim 7, wherein:

the satellite system comprises a Geosynchronous or Mid-Earth Orbit satellite.

11. A method of providing a client device in a remote location secure access to the internet via a satellite connection, the method comprising:

at a satellite system: receiving a first blockchain state signal which encodes information about a first state of a blockchain; and generating and transmitting a first RF broadcast signal encoding information about the first state of the blockchain;

at a client device: receiving the first RF broadcast signal; generating a registration request including a public key ID associated with the client device and a deterministic transformation of contents of atleast a portion of a previous block of the blockchain; and transmitting the registration request to the satellite system;

at the satellite system: receiving the registration request; and transmitting the registration request to an electronic address corresponding to a blockchain associated with an internet service provider (ISP);

at the ISP: determining whether the registration request is a valid registration request, and based on the registration request being a valid request, adding the public key ID to an authorized list, wherein public key IDs on the authorized list indicate client devices that are permitted to access the internet via the satellite system; and at an authorization module that is included in the ISP or the satellite system, granting the client device access to the internet by encrypting a connection session key with a public encryption key associated with the client device, to generate an encrypted connection session key, and sending the encrypted connection session key to the client device, the encrypted connection session key being decryptable by using a private decryption key which is complementary to the public encryption key, and the decrypted connection session key being usable to access the internet.

12. The method of claim 11, wherein:

the electronic address is an electronic address of a blockchain wallet associated with the ISP;

the registration request includes authentication data comprising one or more of:

a deterministic transformation of contents of a previous block of the blockchain, or a portion thereof; and a signature generated using a private signature key of the client device from which the registration request is received; and the public key ID is public verification key which corresponds to the private signature key used to generate the signature.

13. The method of claim 11, wherein:

the ISP or the satellite system includes, or has associated therewith, an access management system to manage access, via the satellite system, to the internet, the access management system comprising a request management system configured to:

receive the registration request from the satellite system or a satellite of the satellite system; and determine whether the registration request received at the electronic address meets a validation criterion, wherein:

in response to the request management system determining that the request received at the electronic address meets the validation criterion, the request management system is configured to determine that the registration request is a valid request; and in response to the request management system determining that the request received at the electronic address does not meet the validation criterion, the request management system is configured to determine that the registration request is not a valid request.

14. The method of claim 11, wherein:

the satellite system is configured to transmit an $i^{th}$ RF broadcast signal at a time $t_{i,0}$, and re-transmit the $i^{th}$ RF broadcast signal a plurality N times, where a $j^{th}$ retransmission takes place at $t_{i,j}$.

15. The method of claim 14, wherein:

after missing a transmission of the $i^{th}$ RF broadcast signal at a time $t_{i,0}$, the client device is configured to:

receive a retransmitted version of the RF broadcast signal from a subsequent history $H_m$ at a time $t_{i,m}$ where m>0, the retransmitted version of the RF broadcast signal encoding information about an $i^{th}$ state of the blockchain; and store the information about the $i^{th}$ state of the blockchain in a memory of the client device.

16. The method of claim 11, wherein:

the registration request comprises a public encryption key associated with the client device.

\* \* \* \* \*